(12) United States Patent
Akaboshi

(10) Patent No.: US 8,015,147 B2
(45) Date of Patent: Sep. 6, 2011

(54) FEATURE EXTRACTION METHOD AND APPARATUS

(75) Inventor: Naoki Akaboshi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 292 days.

(21) Appl. No.: 12/492,833

(22) Filed: Jun. 26, 2009

(65) Prior Publication Data

US 2010/0077092 A1     Mar. 25, 2010

(30) Foreign Application Priority Data

Sep. 11, 2008  (JP) ................................ 2008-233418

(51) Int. Cl.
*G06F 7/00*     (2006.01)

(52) U.S. Cl. ...................................................... 707/602
(58) Field of Classification Search .................. 707/602
See application file for complete search history.

(56) References Cited

U.S. PATENT DOCUMENTS

| 2005/0289231 A1 | 12/2005 | Harada et al. |
| 2006/0265416 A1 | 11/2006 | Seki et al. |

FOREIGN PATENT DOCUMENTS

| JP | 2006-011683 A | 1/2006 |
| JP | 2006-323471 A | 11/2006 |

*Primary Examiner* — Apu Mofiz
*Assistant Examiner* — Ajith Jacob
(74) *Attorney, Agent, or Firm* — Fujitsu Patent Center

(57) ABSTRACT

This method includes: identifying, for each child log having a job type identifier in a message to a lower-layer server and a start time and end time of a processing executed in the lower-layer server, an inclusive parent log that is a parent log having a start time and end time of a processing executed in an upper-layer Web server, wherein the start time and end time of the inclusive parent log define an interval containing a period from the start time to the end time of the child log, and registering the job type identifier in the child log and a path of URI in the inclusive parent log, into a table, and registering a frequency for each combination of the identifier and the path of URI into the table. By using this table, features in the path of URI are extracted for each job type identifier.

6 Claims, 17 Drawing Sheets

| | | | |
|---|---|---|---|
| URL=IIOP-method1<br>START TIME=tcs1<br>END TIME=tce1 | URL=IIOP-method1<br>START TIME=tcs2<br>END TIME=tce2 | URL=IIOP-method1<br>START TIME=tcs3<br>END TIME=tce3 | .... |

FIG.6B

| | | | |
|---|---|---|---|
| ORIGINAL URI=GET/axis/services/sample.asp?<br>taget=1&value=1234&ssid=1245 HTTP/1.0<br>GENUINE URI=GET/axis/services/sample.asp<br>PARAMETER PORTION params=taget=1&value=1234&ssid=1245<br>VERSION ver=HTTP/1.0<br>START TIME=ts1<br>END TIME=te1 | ORIGINAL URI=GET/axis/services/sample.asp?<br>taget=1&value=1234&ssid=1245 HTTP/1.0<br>GENUINE URI=GET/axis/services/sample.asp<br>PARAMETER PORTION params=taget=1&value=1234&ssid=1245<br>VERSION ver=HTTP/1.0<br>START TIME=ts2<br>END TIME=te2 | ORIGINAL URI=GET/axis/services/sample.asp?<br>taget=1&value=1234&ssid=1245 HTTP/1.0<br>GENUINE URI=GET/axis/services/sample.asp<br>PARAMETER PORTION params=taget=1&value=1234&ssid=1245<br>VERSION ver=HTTP/1.0<br>START TIME=ts3<br>END TIME=te3 | .... |

FIG.6A

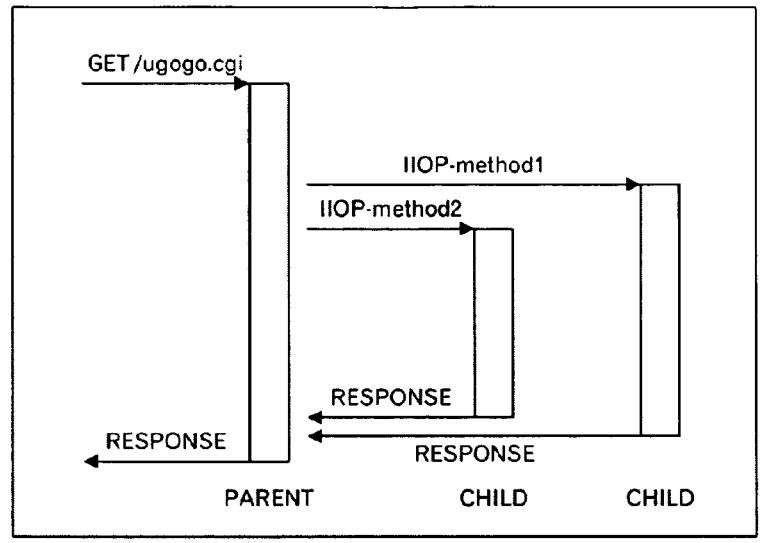
FIG.9
| CHILD | PARENT CANDIDATE |
|---|---|
| I1(1021) | H1(1021), H2(63), H3(19) |
| I2(1154) | H2(1154), H1(49), H3(13) |
| I3(2137) | H1(23), H2(16), H3(7), NONE(2105) |
FIG.11
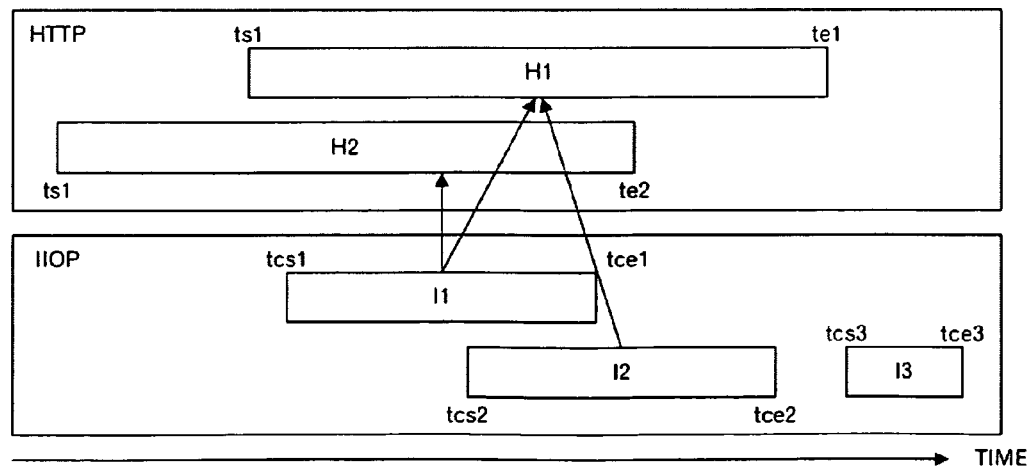
FIG.12

| CHILD | PARENT CANDIDATE |
|---|---|
| I1(1) | H1(1), H2(1) |
| I2(1) | H1(1) |
| I3(1) | NONE(1) |

FIG.13

| | |
|---|---|
| ORIGINAL URI=GET/axis/services/sample.asp?<br>taget=1&value=1234&ssid=1245 HTTP/1.0<br>GENUINE URI=GET/axis/services/sample.asp<br>PARAMETER PORTION  params=taget=1&value=1234&ssid=1245<br>VERSION  ver=HTTP/1.0<br>START  TIME=ts<br>END  TIME=te | IIOP-method1 |
| ORIGINAL URI=GET/axis/services/sample.asp?<br>taget=1&value=1234&ssid=1245 HTTP/1.0<br>GENUINE URI=GET/axis/services/sample.asp<br>PARAMETER PORTION  params=taget=1&value=1234&ssid=2345<br>VERSION  ver=HTTP/1.0<br>START  TIME=ts<br>END  TIME=te | IIOP-method2 |
| ORIGINAL URI=GET/axis/services/sample.asp?<br>taget=1&value=1234&ssid=1245 HTTP/1.0<br>GENUINE URI=GET/axis/services/sample.asp<br>PARAMETER PORTION  params=taget=1&value=1234&ssid=3456<br>VERSION  ver=HTTP/1.0<br>START  TIME=ts<br>END  TIME=te | IIOP-method3 |
| ⋮ | ⋮ |

FIG.14

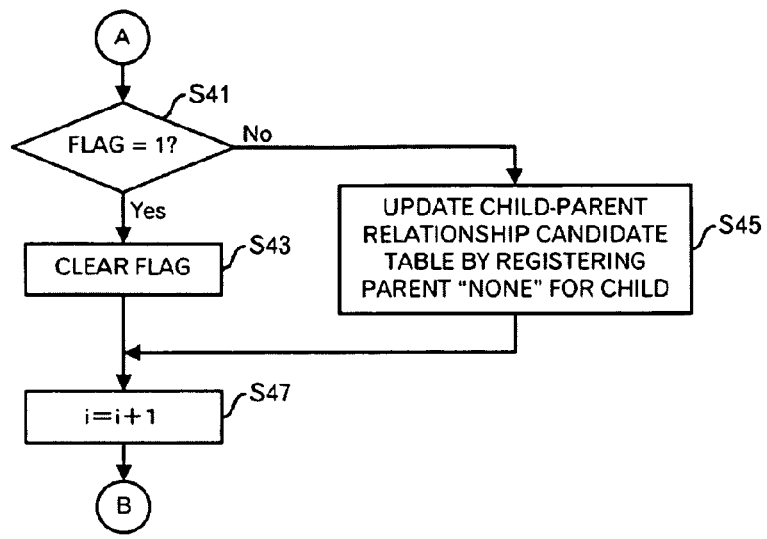
FIG.15
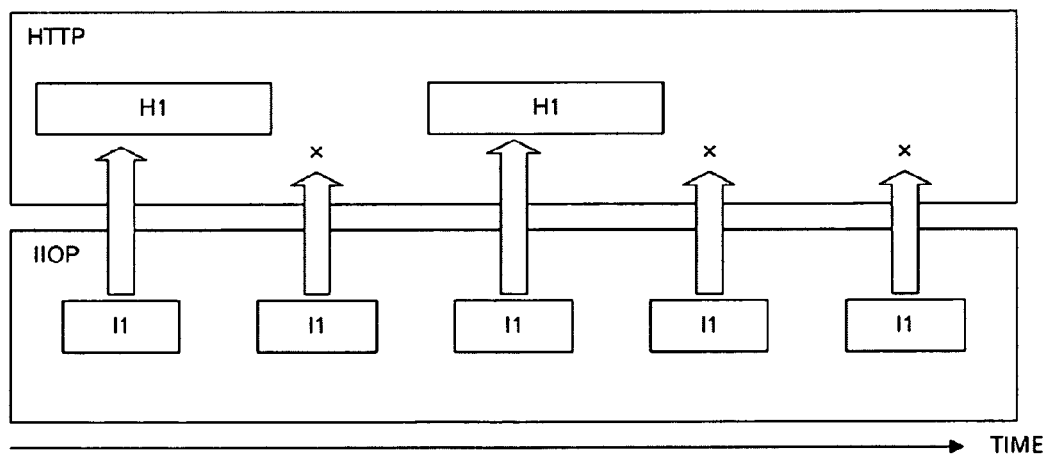
FIG.16
| CHILD | PARENT CANDIDATE |
|---|---|
| I1(5) | H1(2), NONE(3) |
FIG.17

| CHILD LOG JOB TYPE IDENTIFIER | PARENT LOG PATH OF URI | FLAG | VARIABLE + VALE | |
|---|---|---|---|---|
| IIOP-method1 | /ugogo.cgi | P1 | target=2 | |
| IIOP-method2 | /ugogo.cgi | P1 | target=3 | |
| IIOP-method3 | /gaogao.cgi | C | | |
| IIOP-method4 | /hegehege.cgi | P2 | kk=3 | target=2 |
| IIOP-method5 | /hegehege.cgi | P2 | kk=2 | target=2 |
| IIOP-method10 | NONE | C | | | sid=1000&ssid=12117&uid=454613&target=2 sid=1000&ssid=11112&uid=454613&target=2 sid=1002&ssid=13312&uid=414613&target=2

FIG.22 sid=1100&ssid=13126&uid=254611&target=3 sid=1201&ssid=14123&uid=154614&target=3 sid=1202&ssid=15312&uid=614615&target=3

FIG.23 sid=1000&ssid=12117&kk=3&target=2 sid=1000&ssid=11112&kk=3&target=2 sid=1002&ssid=13312&kk=3&target=2

FIG.24 sid=1100&ssid=13126&kk=2&target=2 sid=1201&ssid=14123&kk=2&target=2 sid=1202&ssid=15312&kk=2&target=2

FIG.25

| CHILD LOG JOB TYPE IDENTIFIER | PARENT LOG PATH OF URI | FLAG | VARIABLE + VALUE | |
|---|---|---|---|---|
| IIOP-method1 | /ugogo.cgi | P1 | target=2 | |
| IIOP-method2 | /ugogo.cgi | P1 | target=3 | |
| IIOP-method3 | /gaogao.cgi | C | | |
| IIOP-method4 | /hegehege.cgi | P2 | kk=3 | |
| IIOP-method5 | /hegehege.cgi | P2 | kk=2 | |
| IIOP-method10 | NONE | C | | |

FIG.27

```
GROUP 1: IIOP-method1
    URL=http://hogehoge.com/ugogo.cgi  CGI:target=2
GROUP 2: IIOP-method2
    URL=http://hogehoge.com/ugogo.cgi  CGI:target=3
GROUP 3: IIOP-method3
    URL=http://hogehoge.com/gaogao.cgi  CGI:NONE
GROUP 4: IIOP-method4
    URL=http://hogehoge.com/hegehege.cgi  CGI:kk=3
GROUP 5: IIOP-method5
    URL=http://hogehoge.com/hegehege.cgi  CGI:kk=2
GROUP 6: IIOP-method10
    NONE
```

FEATURE EXTRACTION METHOD AND APPARATUS

CROSS-REFERENCE TO RELATED APPLICATIONS

This application is based upon and claims the benefit of priority of the prior Japanese Patent Application No. 2008-233418, filed on Sep. 11, 2008, the entire contents of which are incorporated herein by reference.

FIELD

This technique relates to a technique to extract a feature portion of a Uniform Resource Identifier (URI), which is to distinguish jobs carried out in a plural-layer server system and is included in a message sent to a web server in an upper layer.

BACKGROUND

An activity that an access history to Web sites is analyzed to utilize the analysis result to sales strategies and the like is widely carried out, and a Uniform Resource Locator (URL) parameter analysis function is used as an analysis function of dynamically generated Web pages (e.g. certain types of pages such as cgi, jsp, asp, php and the like).

On the other hand, a Web system is a multi-layer server system as depicted in FIG. 1, typically. Namely, a load distribution apparatus is connected to the Internet or the like, and under this apparatus, a Web server as a first layer, an application server as a second layer, and a DB server as a third layer are provided. Then, when a message is transmitted from, for example, a user terminal to the Web server through the Internet and the load distribution apparatus by the Hyper Text Transfer Protocol (HTTP), the Web server carries out a processing A and transmits a request to the application server by the Internet Inter-ORB Protocol (IIOP). The application server carries out a processing C, and further transmits a SQL request to the DB server by the IIOR The DB server carries out a processing D1, and further transmits the result to the application server. The application server receives the processing result from the DB server, carries out a processing D2, and transmits the result to the Web server. The Web server receives the processing result from the application server, carries out a processing B, and transmits the final processing result to the user terminal through the load distribution apparatus, the Internet and the like.

At this time, the HTTP message sent from the user terminal includes an IP address corresponding to hogehoge.com, which is a machine name, for example, and "/ugogo.cig?sid=1000&target=1", which represents path and parameter portion, ("/ugogo.cgi" represents the path, and "sid=1000&target=1" after "?" or ";" represents the parameter portion.). In this application, in order to make it easy to understand, the following expression may be used, in which the IP address is replaced with the machine name and the machine name is connected with the path and parameter portion.

http://hogehoge.com/ugogo.sig?sid=1000&target=1

Incidentally, "http" represents a scheme.

As depicted in FIG. 2, what processing is carried out unclear only from a static portion until the path in the URI, and it is possible to distinguish, according to the parameter portion, which is a dynamic portion, especially, according to a value of a target variable, which of the processing X and Y is carried out in response to the HTTP request. Thus, the parameter portion has a meaning as the selection means of the processing content or a meaning as data.

However, a conventional Web log analysis tool merely lists the variables or the like, and merely displays the appearance frequencies or ratios. Accordingly, it cannot carry out the analysis paying attention to the meanings or functions of the variables.

In addition, even if it is possible to distinguish which of the processing X and Y is executed, it may be difficult to identify which is a HTTP message corresponding to the processing X and which is a HTTP message corresponding to the processing Y. Basically, as depicted in FIG. 1, the time interval in the upper-layer server from the processing start time to the processing end time includes the time interval in the lower-layer server from the processing start time to the processing end time. However, when only logs in each server are observed especially from the Web server side, there is a case where the HTTP message cannot be associated with the business processing, correctly.

As described above, the conventional technique cannot appropriately extract the relationship between the business processing and the message from log data of the multi-layer server system, and cannot extract the path and parameters, which characterize the business processing.

More specifically, a technique to extract the feature portion of the URI, which is included in the message to the upper-layer Web server, and characterizes the business processing to be carried out, does not exist.

SUMMARY

According to an aspect of this technique, this feature extraction method is a method for extracting a feature portion of a URI, which distinguishes a job executed in a lower-layer server in a multi-layer server system and is included in a message to an upper-layer Web server. This method includes: providing a child log data storage storing child logs, each having a job type identifier included in a first message to the lower-layer server and a start time and an end time of a processing executed in the lower-layer server in response to the first message, and a parent log data storage storing parent logs, each having the URI included in a second message to the upper-layer Web server and a start time and an end time of a processing executed in the upper-layer Web server in response to the second message; identifying, for each of the child logs, an inclusive parent log that is a parent log having the start time and the end time, which define a time interval containing a time period from the start time to the end time of the child log, from the parent log data storage, and registering the job type identifier included in the child log and the path of the URI, which is included in the inclusive parent log, into a child-parent relationship candidate table, and counting and registering frequencies of combinations of the job type identifier and the path of the URI into the child-parent relationship candidate table; extracting, from the child-parent relationship candidate table, the path of URI, which is included in the combination whose counted frequency is the maximum, for each of the job type identifiers, and registering a set of the job type identifier and the extracted path of the URI into a child-parent relationship list; and identifying, in the child-parent list, the set satisfying a condition that the path of the URI in the set does not match the paths of the URIs in the other sets.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6A is a diagram depicting an example of data stored in a parent log storage;

FIG. 6B is a diagram depicting an example of data stored in a child log storage;

FIG. 9 is a diagram to explain the child-parent relationship;

FIG. 11 is a diagram depicting an example of a child-parent relationship candidate table;

FIG. 12 is a diagram depicting a relation between a processing time of the parent log and a processing time of the child log;

FIG. 13 is diagram depicting an example of the child-parent relationship candidate table;

FIG. 14 is a diagram depicting an example of data after change, which is stored in the parent log storage;

FIG. 15 is a diagram depicting a processing of the child-parent relationship candidate generation processing;

FIG. 16 is a diagram depicting the relation between the processing of the parent log and the processing of the child log;

FIG. 17 is a diagram depicting an example of the child-parent relationship candidate table;

FIG. 22 is a diagram to explain a feature portion of a parameter portion;

FIG. 23 is a diagram to explain the feature portion of the parameter portion;

FIG. 24 is a diagram to explain the feature portion of the parameter portion;

FIG. 25 is a diagram to explain the feature portion of the parameter portion;

FIG. 27 is a diagram depicting an example of the child-parent relationship list;

DESCRIPTION OF EMBODIMENTS

Figure 3:
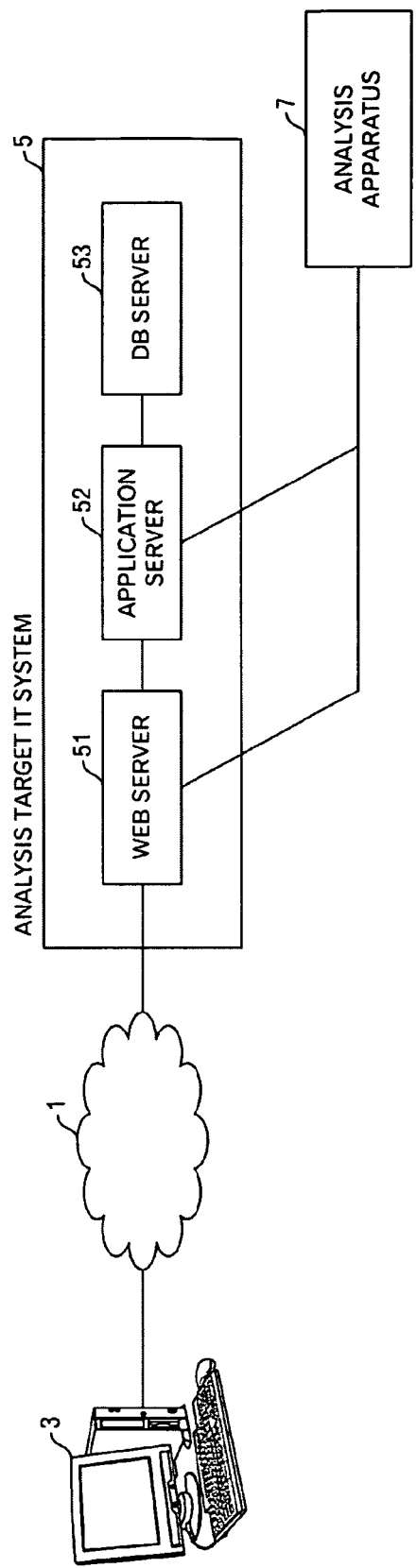
FIG. 3 is a diagram depicting an entire configuration of the system.

FIG. 3 depicts a system outline in an embodiment of this technique. For example, plural user terminals 3 and an analysis target IT system 5 are connected to a network 1, which may be the Internet, and the user terminals 3 communicate with the analysis target IT system 5 through the network 1. For example, the analysis target IT system 5 is a three-layer server system including a Web server 51, an application server 52 and a DB server 53. However, the analysis target IT system 5 may be a two-layer system or a further multi-layer system.

In this embodiment, an analysis apparatus 7 is connected to the Web server 51 and the application server 52, and obtains logs (hereinafter, called parent logs) generated in the upper-layer Web server 51 and logs (hereinafter, called child logs) generated in the lower-layer application server 52 and carries out a processing described below.

Figure 4:
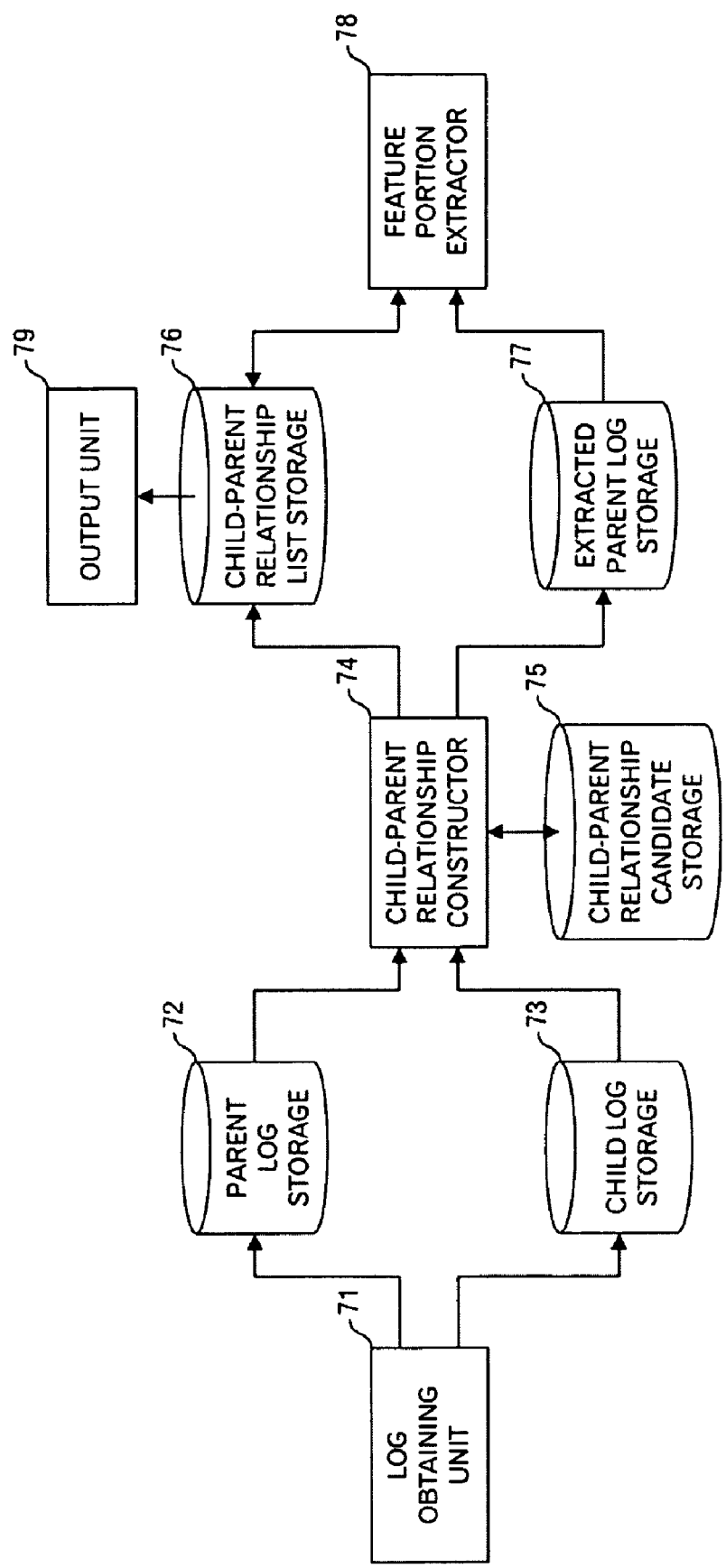
FIG. 4 is a functional block diagram of an analysis apparatus.

FIG. 4 depicts a configuration of the analysis apparatus 7. The analysis apparatus 7 has a log obtaining unit 71 that obtains parent logs and child logs from the Web server 51 and the application server 52; a parent log storage 72 that stores the parent logs obtained by the log obtaining unit 71; a child log storage 73 that stores the child logs obtained by the log obtaining unit 71; a child-parent relationship constructor 74 that carries out a processing for constructing the child-parent relationship and the like by using data stored in the parent log storage 72 and the child log storage 73; a child-parent relationship candidate table storage 75 that stores a child-parent relationship candidate table generated by the child-parent relationship constructor 74; a child-parent relationship list storage 76 that stores the child-parent relationship confirmed by the child-parent relationship constructor 74; an extracted parent log storage 77 that stores the parent logs, which are extracted by the child-parent relationship constructor 74 and relates to the following processing; a feature portion extractor 78 that carries out a processing to extract a feature portion of the URI relating to the business processing, by using data stored in the child-parent relationship list storage 76 and the extracted parent log storage 77; and an output unit 79 that outputs an analysis result by using data finally stored in the child-parent relationship list storage 76.

In the following, a processing content of the analysis apparatus 7 will be explained by using FIGS. 5 to 28. First, the log obtaining unit 71 obtains the parent logs from the Web server 51, stores the obtained parent logs into the parent log storage 72, obtains the child logs from the application server 52, and stores the obtained child logs into the child log storage 73 (step S1). FIG. 6A depicts an example of data stored in the parent log storage 72. FIG. 6A depicts an example that logs are arranged sequentially from the top in ascending order of the time. Each log includes an original URI (e.g. /axis/services/sample.asp?target=1&value=1234&ssid=1245 HTTP/1.0), a genuine URI (i.e. path) (e.g. /axis/services/sample.asp), a parameter portion "params" (e.g. target=1&value=1234&ssid=1245), a version "ver" (e.g. HTTP/1.0), a start time (e.g. ts1) and an end time (e.g. te1).

The original URI is described in the first line of the header portion in the HTTP message. Other header items are contained in the header portion of the HTTP message. However, those are unnecessary in this embodiment. The body portion of the HTTP message is also unnecessary.

The path and parameter portion can be separated by "?" or ";" in the original URI, and each parameter (variable=value)

can be separated also in the parameter portion by "&" or ";" Namely, in the aforementioned example, "target" "value" and "ssid" are variables, and "1", "1234" and "1245" are respective values of the variables. The version is also described after the parameter portion in the first line of the header of the HTTP message, and it can be separated.

The start time is a time when the HTTP message for this parent log was received and the processing for this message begins, and the end time is a time when a response to this HTTP message was transmitted.

In addition, FIG. 6B depicts an example of data stored in the child log storage 73. Also in FIG. 6B, the logs are arranged sequentially from the top in ascending order of the time as depicted in FIG. 6A. Each log includes a URL (e.g. IIOP-method01. this effects as a job type identifier) included in an IIOP message, a start time (e.g. tcs1) and an end time (e.g. tce1).

Figure 5:
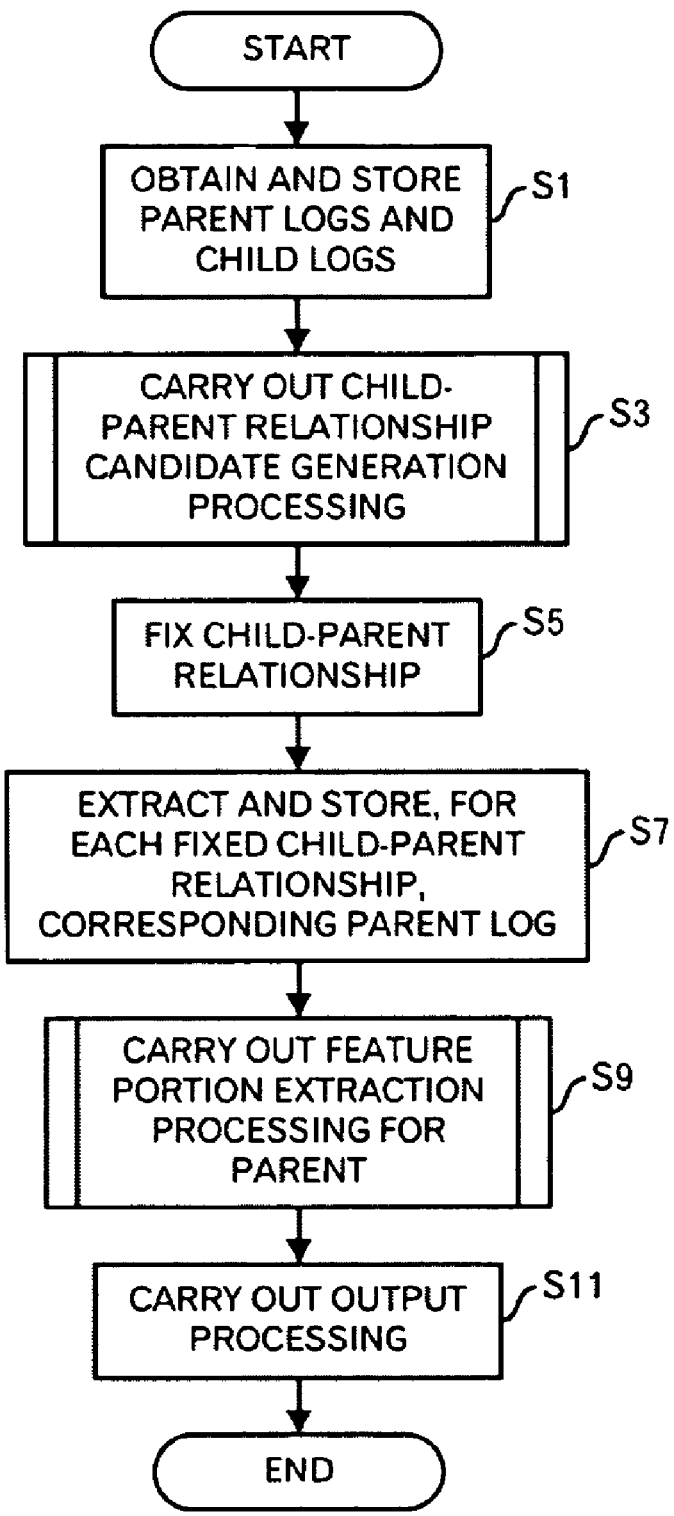
FIG. 5 is a diagram depicting a main processing flow in the analysis apparatus.

Returning to the explanation of FIG. 5, the child-parent relationship constructor 74 next carries out a child-parent relationship candidate generation processing (step S3). This child-parent relationship candidate generation processing will be explained by using FIGS. 7 to 17.

Figure 1:
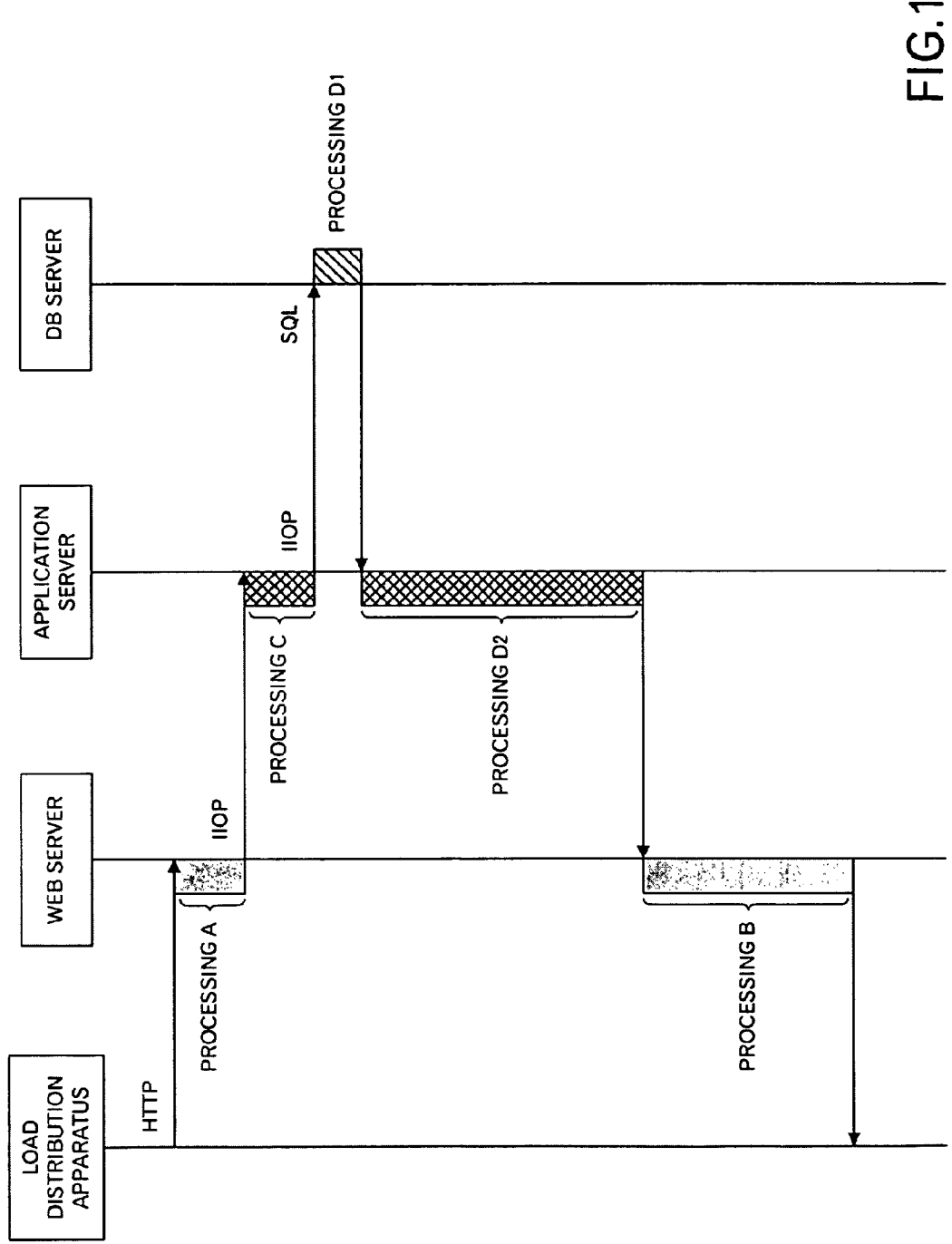
FIG. 1 is a diagram to explain an outline of a processing in a multi-layer system.
Figure 2:
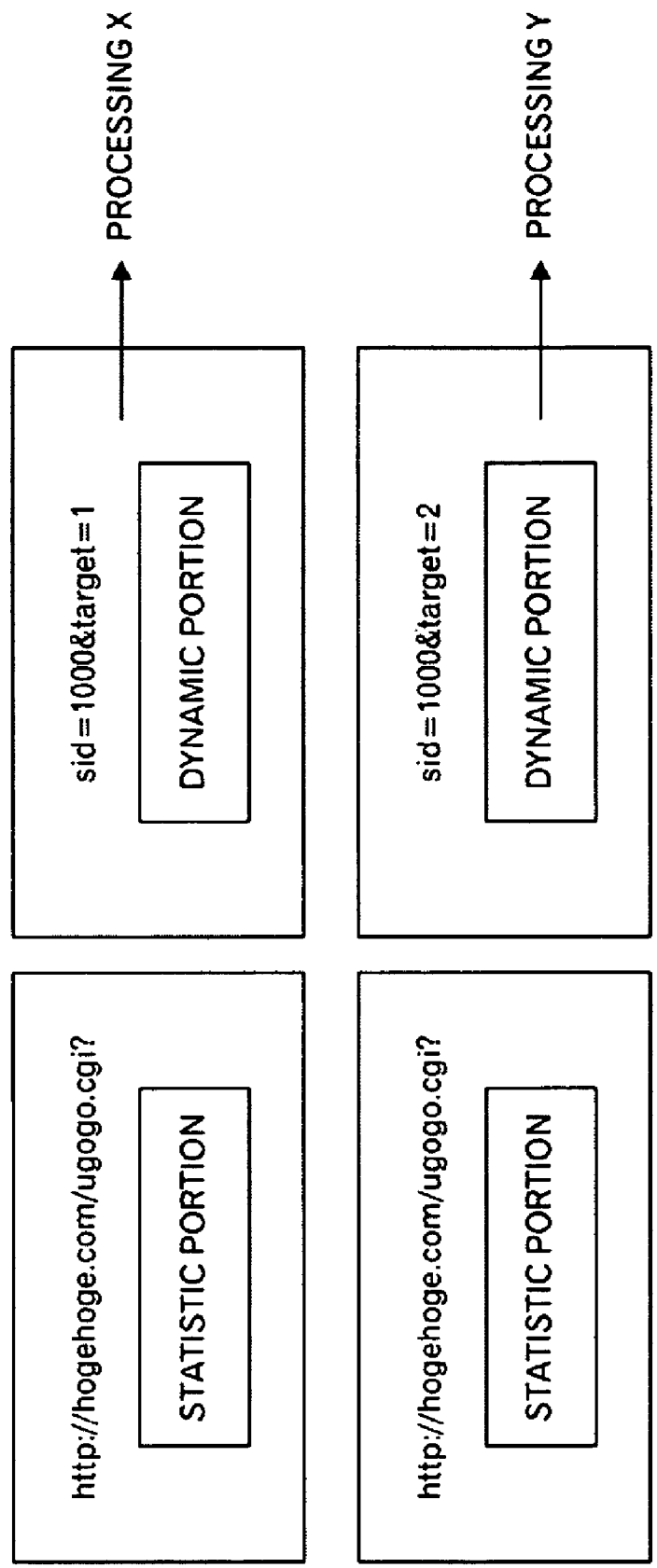
FIG. 2 is a schematic diagram representing a relation among a job type, a host name and path and a parameter portion.

First, the premises of the child-parent relationship candidate generation processing will be explained. As depicted in FIG. 1, a parent-child relationship exists between the processing of the Web server, which receives the HTTP message and carries out a processing for the HTTP message, and the processing of the application server, which receives the IIOP message from the Web server and carries out a processing for the IIOP message. When a chained flow of the messages can be grasped in real time as depicted in FIG. 1, the parent-child relationship is clear and it is not difficult to identify the child processing from the parent processing. However, it is impossible to grasp the chained flow of the messages in real time, and it is necessary to identify the relationship later by using the data in a format that the parent log and the child log are separated.

Basically, because the inclusion of the processing time exists as depicted also in FIG. 1, the child log can be identified from the parent log. However, the inventor newly found that the business processing, which is hidden unintentionally, exists when the inclusion is judged from the parent logs. Specifically, when the child logs for processing such as backup, which is carried out periodically (when it is an important job, the backup processing is carried out at a short interval.) are generated, the parent-child relationship is extracted when the accidental inclusion of the processing time is found though the parent log generated in response to the HTTP message from the outside is irrelevant to such child logs. In addition, in case of such a backup processing, because the parent log fundamentally does not exist, a problem that a lot of child logs whose parent-child relationship cannot be identified occur and are not investigated.

Therefore, in this embodiment, because, as data to identify the business processing, which is actually carried out, the child logs are more reliable than the parent logs, the child logs are used to identify the child-parent relationship.

Figure 7:
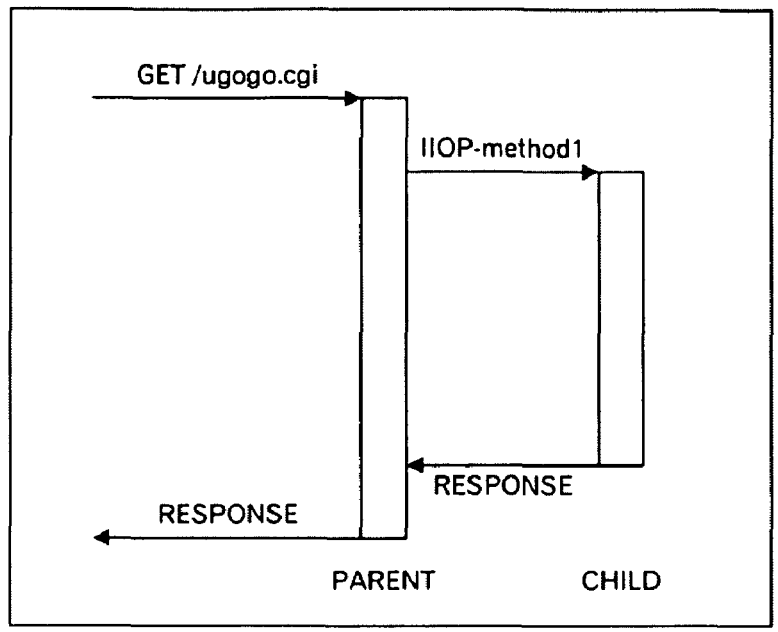
FIG. 7 is a diagram to explain a child-parent relationship.

In the child-parent relationship candidate generation, as depicted in FIG. 7, when the processing time of the parent processing completely contains the processing time of the child processing, there is no problem that a pair of the path (e.g. ugogo.cig) of the URI in the parent log and the URI (e.g. IIOP-method1. this is also called job type identifier in the following.) in the child log is identified as a child-parent relationship candidate.

Figure 8:
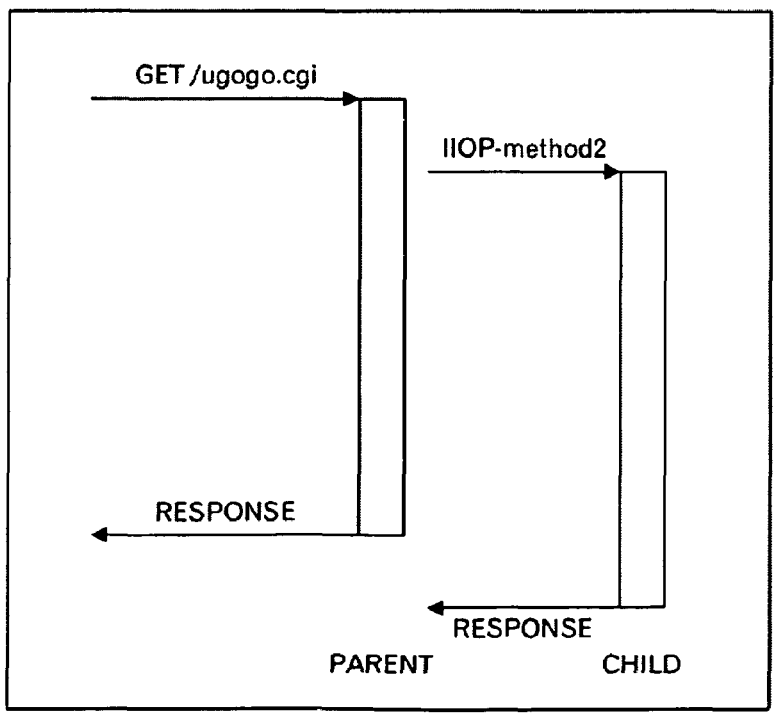
FIG. 8 is a diagram to explain the child-parent relationship.

On the other hand, as depicted in FIG. 8, when the processing time of the parent processing does not completely contain the processing time of the child processing, the child-parent relationship candidate is not identified.

Furthermore, as depicted in FIG. 9, when the processing of the parent processing completely contains the processing times of the two child processing, it is unclear, only from this information, which should be identified as the child-parent relationship candidate. Because at least either processing is carried out at a timing which seems to be accidentally synchronous, it is statistically determined which of the child logs is associated with the path of the URI in the parent log as described below.

Next, the child-parent relationship candidate generation processing will be explained by using FIGS. 10-17, specifically. First, the child-parent relationship constructor 74 initializes a child log counter i to "1" (step S21). Then, the child-parent relationship constructor 74 judges whether or not the i-th child log in the child log storage 73 exists (step S23). When there is no child log, the processing returns to the original processing.

On the other hand, when the i-th child log exists, the child-parent relationship constructor 74 reads out the i-th child log from the child log storage 73 (step S25). In addition, the child-parent relationship constructor 74 initializes a parent log counter j to "1" (step S27). Furthermore, the child-parent relationship constructor 74 reads out the j-th parent log from the parent log storage 72 (step S29). Then, the child-parent relationship constructor 74 judges whether or not the i-th child log and the j-th parent log satisfy a condition for the child-parent relationship (step S31). It is judged whether or not the relationship between the processing time of the parent and the processing time of the child, as depicted in FIG. 7, exists. More specifically, it is judged whether or not a condition of the parent start time $\leq$ the child start time and the parent end time $\geq$ the child end time are satisfied.

When it is judged that the condition for the child-parent relationship is not satisfied, the processing shifts to step S37. On the other hand, when the condition for the child-parent relationship is satisfied, the child-parent relationship constructor 74 sets "1" to a flag (step S33), and updates the child-parent relationship table stored in the child-parent relationship candidate table storage 75 based on the currently identified child-parent relationship (step S35). An example of the child-parent relationship candidate table is depicted in FIG. 11. The table example in FIG. 11 includes a column of a child job type identifier and a column of a parent candidate, and for each child job type (In FIG. 11, simply, I1, I2 and I3), the path (In FIG. 11, H1, H2 and H3) of the URI of the parent candidate are registered. Incidentally, in order to carry out a statistical processing, the appearance frequencies of the job type identifiers and the appearance frequencies of the path of the URI are also registered. In the example of FIG. 11, the value in the parentheses next to the job type identifier represents the appearance frequency of the job type identifier and the value in the parentheses next to the path of the URI represents the appearance frequency of the path of the URI.

Therefore, at the step S35, in case of the newly detected job type identifier, the job type identifier is registered into the column of the child and the path of the URI is also registered into the column of the parent candidate, and "1" is set as the appearance frequencies of them. In addition, when the job type identifier has already been detected but the combination with the path of the URI is newly detected, the appearance frequency of the job type identifier is incremented by "1", and the path of the URI is registered in the column of the parent candidate in the line in which the already detected job type identifier has been registered, and further "1" is set as the appearance frequency of the path of the URI. When the combination of the job type identifier and the path of the URI has already been registered, both of the appearance frequencies in the line of the job type identifier are incremented by "1".

A specific example will be explained by using FIG. 12. In FIG. 12, in the upper section HTTP, a relation between the start time ts and the end time te of the parent log is represented, and in the lower section IIOP, a relation between the start time tcs and the end time tce of the child log is represented. Here, when it is assumed that there are two parent logs and three child logs, the processing time of the child log whose job type identifier is "I1" is contained both in the processing time of the parent log whose path of the URI is "H1" and the processing time of the parent log whose path of the URI is "H2" Therefore, as depicted in FIG. 13, in the column of the child in the child-parent relationship candidate table, the job type identifier I1 and the appearance frequency "1" are registered, and the path "H1" of the URI and the appearance frequency "1" and the path "H2" of the URI and the appearance frequency "1" are registered as the parent candidate data in the line of this job type identifier I1. Moreover, the processing time of the child log whose job type identifier is "I2" is contained in the processing time of the parent log whose path of the URI is "H1" Therefore, as depicted in FIG. 13, in the column of the child in the child-parent relationship candidate table, the job type identifier "I2" and the appearance frequency "1" are registered, and the path "H1" of the URI and the appearance frequency "1" are registered as the parent candidate in the line of the job type identifier "I2". Incidentally, the processing time of any parent log does not contain the processing time of the job type identifier "I3". Therefore, as depicted in FIG. 13, in the column of the child in the child-parent relationship candidate table, the job type identifier "I3" and the appearance frequency "1" are registered, and "none" and the appearance frequency "1" are registered as the parent candidate in the line of the job type identifier "I3". Although such a parent candidate "none" is not registered at the step S35, it is registered at step S45 described below.

Incidentally, here, the job type identifier (e.g. IIOP-method1) is registered in the parent log storage 72 in association with the j-th parent log, which satisfies a condition for the child-parent relationship. For example, as depicted in FIG. 14, the job type identifier (URI) included in the child log is associated with the parent log. In FIG. 14, because the state as depicted in FIG. 9 is not assumed, one job type identifier is associated with one parent log. However, plural job type identifiers may be associated with one parent log. By carrying out such an update processing of the parent log storage 72, the later processing becomes simple.

Figure 10:
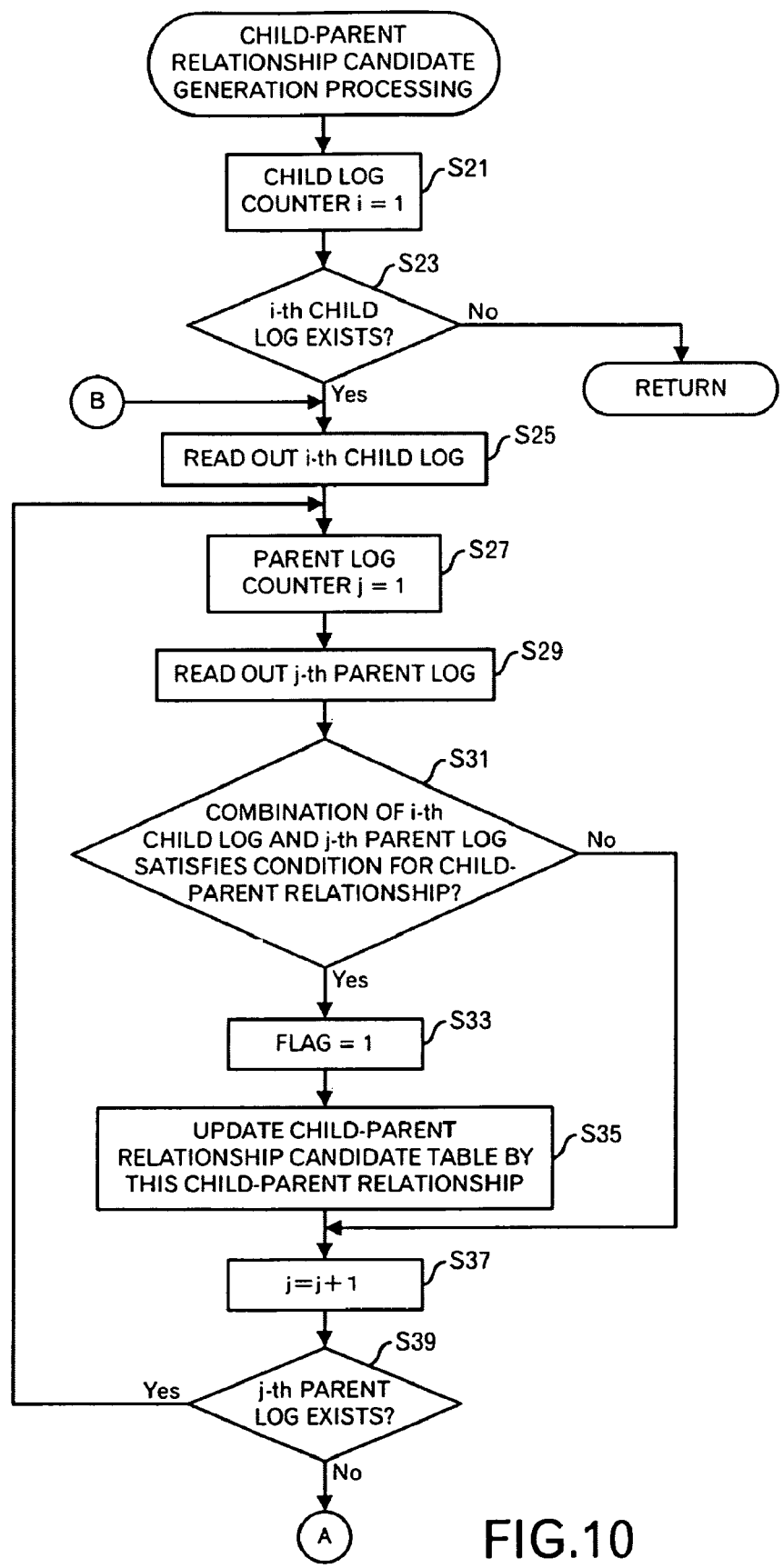
FIG. 10 is a diagram depicting a processing flow of a child-parent relationship candidate generation processing.

Returning to the explanation of the processing in FIG. 10, the child-parent relationship constructor 74 increments j by "1" (step S37), and judges whether or not the j-th parent log exists (step S39). When the j-th parent log exists, the processing returns to the step S27. On the other hand, when the j-th parent log does not exist, the processing shifts to a processing of FIG. 15 through a terminal A.

Shifting to the explanation of the processing of FIG. 15, the child-parent relationship constructor 74 next judges whether or not "1" is set to the flag (step S41). When the condition for the child-parent relationship is satisfied and the processing passed through the step S33 even once, "1" is set to the flag, and "none" is not registered in the child-parent relationship table. Therefore, when "1" is set to the flag, the child-parent relationship constructor 74 clears the flag for the next processing (step S43). Then, the processing shifts to step S47.

On the other hand, when "1" is not set to the flag, it means that the condition for the child-parent relationship is not satisfied for all parent logs. Therefore, the child-parent relationship constructor 74 updates the child-parent relationship candidate table by registering "none" for the parent in association with the child log being processed (step S45). Namely, like a case of the job type identifier I3 in FIG. 12, when I3 is newly registered, the job type identifier I3 and the appearance frequency "1" are registered in the column of the child, and "none" as the parent candidate and the appearance frequency "1" are registered in the line for the job type identifier I3. In addition, when the job type identifier I3 has already been registered but "none" is newly registered, the appearance frequency of the job type identifier I3 is incremented by "1" in the column of the child, and "none" as the parent candidate and the appearance frequency "1" are registered in the line of the job type identifier I3. Furthermore, when the combination of the job type identifier I3 and the parent candidate "none" has already been registered, the appearance frequency for each of the job type identifier I3 and "none" is incremented by "1". Then, the processing shifts to the step S47.

As described above, as depicted in FIG. 16, when a message including the job type identifier I1 for the backup processing or the like is periodically outputted, there is a case where the processing time of the child log whose job type identifier is "I1" accidentally synchronizes with the processing of a certain parent log, and is contained in the processing time of the parent log whose path of the URI is "H1". In FIG. 16, there are 5 child logs, and there is no parent log for 3 child logs among 5. The parent log whose path of the URI is H1 is found for the two remaining child logs. Therefore, the child-parent relationship candidate table as depicted in FIG. 17 is obtained. Namely, "none" as the parent candidate is superior to the child logs. As described below, when the appearance frequency of the parent candidate "none" is finally the maximum, it is determined that the parent does not exist for the job type identifier I1, and this determination is presented to the user. Namely, the user can grasp that the processing relating to the job type identifier I1 does not relate to the Web server 51.

On the other hand, when the child log is searched from the parent log like the conventional technique, two child logs whose job type identifier is "I1" are found for the path H1 of the URI. Therefore, the parent-child relationship of the path H1 of the URI and the job type identifier I1 may be determined. Namely, three remaining child logs, which do not satisfy the condition for the child-parent relationship, are ignored. According to this embodiment, it is possible to prevent from identifying such an incorrect parent-child relationship.

After that, the child-parent relationship constructor 74 increments "i" by "1" (step S47), and the processing returns to the step S25 of FIG. 10 through a terminal B.

By carrying out such a processing, the combinations of the job type identifier and the path of the URI, which satisfy the condition for the child-parent relationship, can be appropriately registered into the child-parent relationship candidate table together with the appearance frequency. There is no child log, which was ignored in the conventional art, and the actual business processing is reflected to the child-parent relationship candidate table, correctly.

Returning to the explanation of FIG. 5, the child-parent relationship constructor 74 fixes the child-parent relationship by selecting the path of the URI or "none" whose appearance frequency is the maximum for each line in the child-parent relationship candidate table stored in the child-parent relationship candidate storage 75, and stores the result into the child-parent relationship list storage 76 (step S5). In the example of FIG. 11, as for the job type identifier I1, the path H1 of the URI is selected, and as for the job type identifier I2, the path H2 of the URI is selected, and as for the job type identifier I3, "none" is selected.

Figures 18, 19:
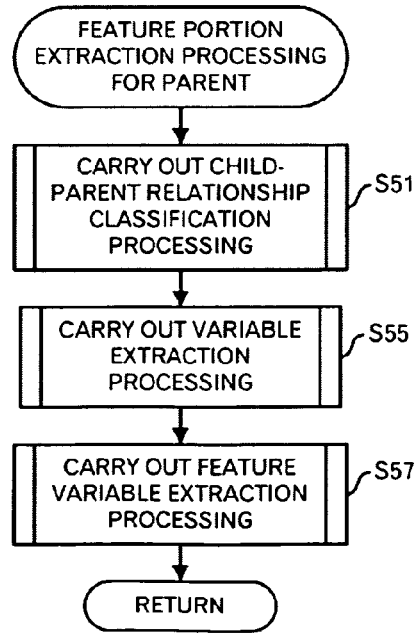
FIG. 18 is a diagram depicting an example of a child-parent relationship list.
FIG. 19 is a diagram depicting a processing of a feature portion extraction processing for the parent.
Figure 20:
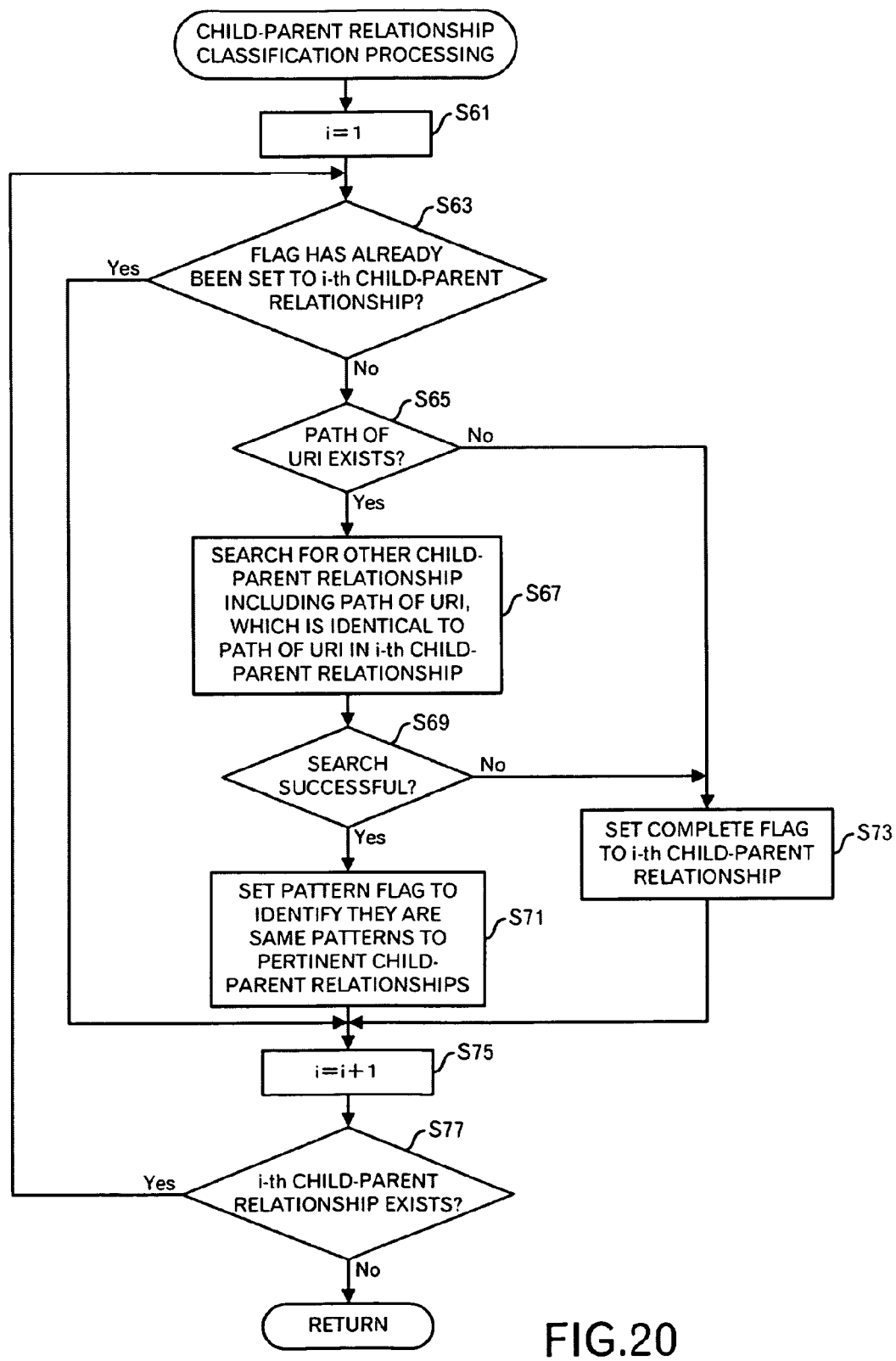
FIG. 20 is a diagram depicting a processing of a child-parent relationship classification processing.
Figure 21:
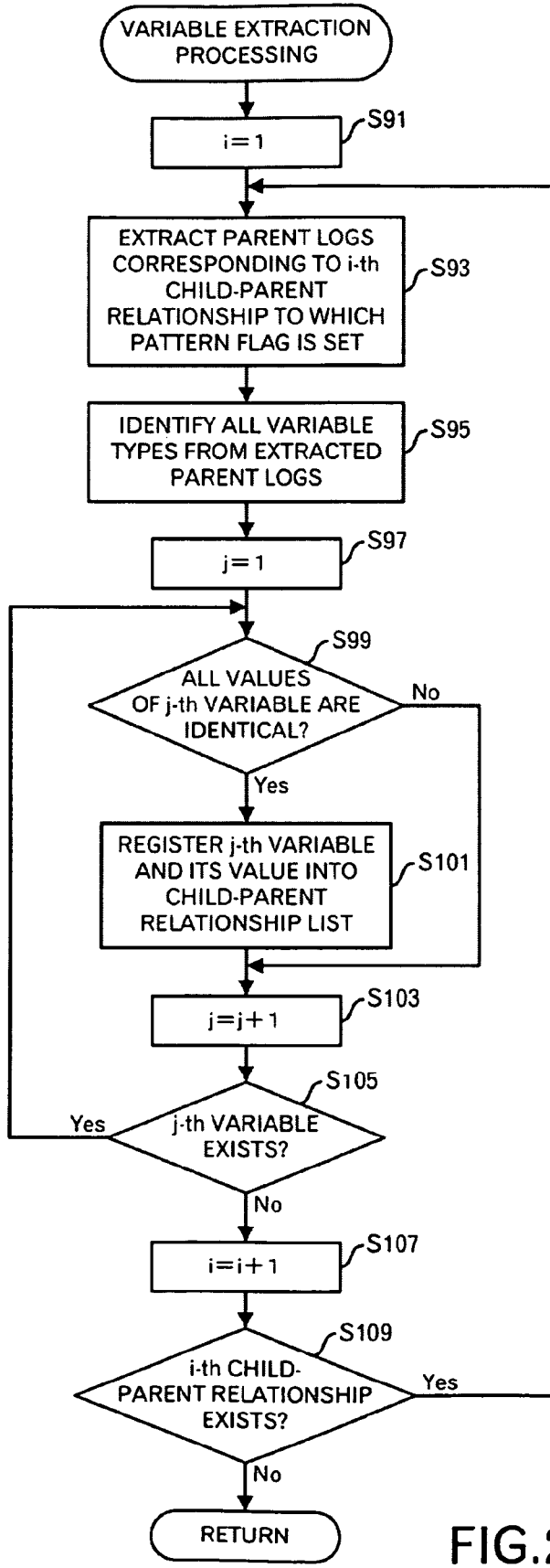
FIG. 21 is a diagram depicting a processing of a variable extraction processing.
Figure 26:
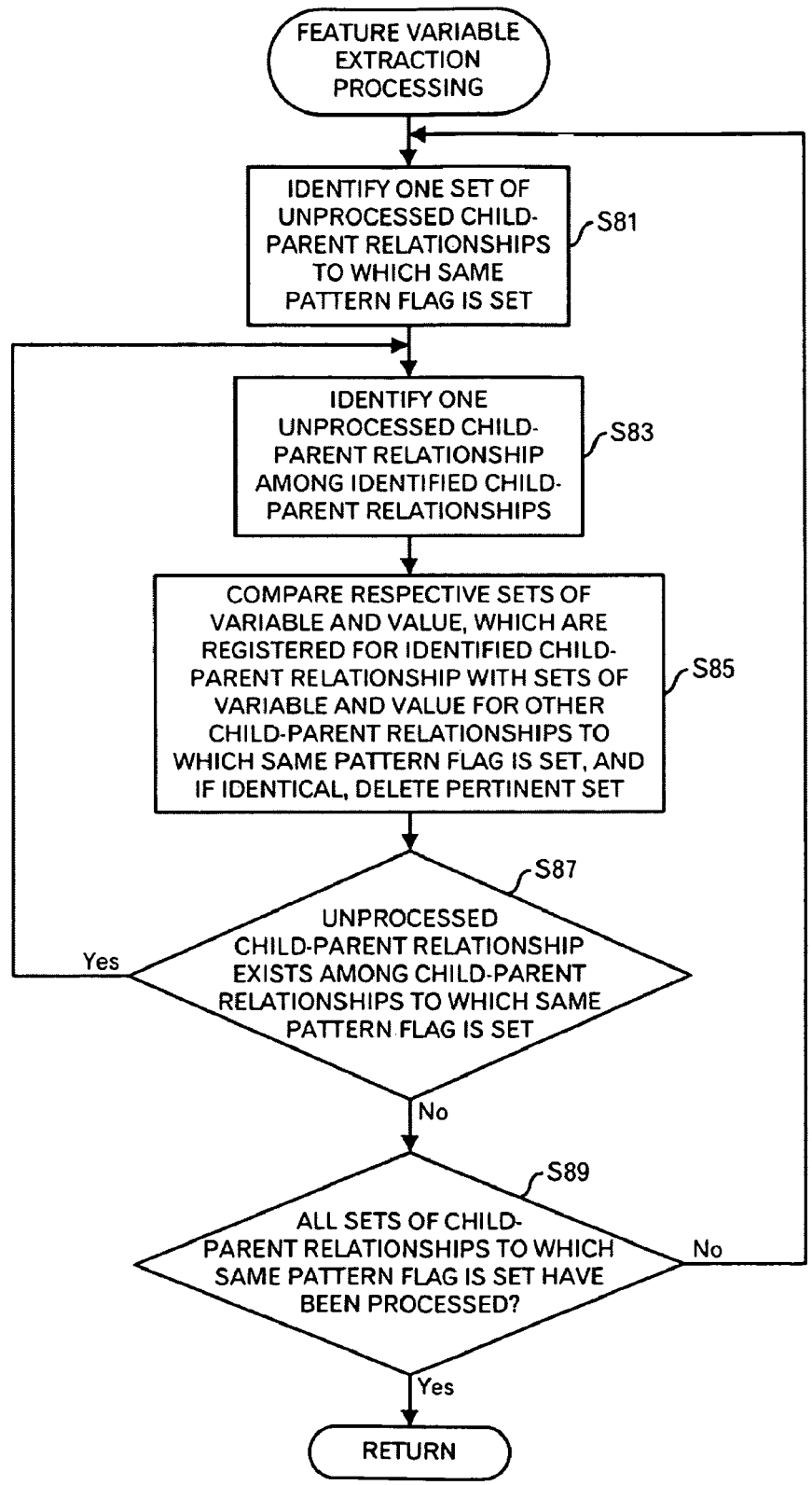
FIG. 26 is a diagram depicting a processing flow of a feature variable extraction processing.

For the following explanation, it is assumed that data as depicted in FIG. 18 is obtained, for example. In the example of FIG. 18, a set of the job type identifier IIOP-method1 of the child log and the path /ugogo.cgi of the URI of the parent log, a set of the job type identifier IIOP-method2 of the child log and the path /ugogo.cgi of the URI of the parent log, a set of the job type identifier IIOP-method3 of the child log and the path /gaogao.cgi of the URI of the parent log, a set of the job type identifier IIOP-method4 of the child log and the path /hegehege.cgi of the URI of the parent log, a set of the job type identifier IIOP-method5 of the child log and the path /hegehege.cgi of the URI of the parent log, and a set of the job type identifier IIOP-method10 of the child log and the path "none" of the URI of the parent log are registered. Incidentally, any values are not registered at the step S5 in the column of the flag and in the column of variable+value.

Next, the child-parent relationship constructor 74 extracts, for each fixed child-parent relationship, a pertinent parent log from the parent log storage 72, and stores the extracted parent log into the extracted parent log storage 77 (step S7). The parent log storage 72 is searched, for each of the child-parent relationships in the child-parent relationship list, by using the path of the URI and the job type identifier, which are included in the child-parent relationship being processed, to extract the pertinent parent log. The parent logs in the data format as depicted in FIG. 14 are stored in the extracted parent log storage 77. By preparing such data, the speed of the processing described below is improved.

Next, the feature portion extractor 78 carries out a feature portion extraction processing for the parent (step S9). The feature portion extraction processing for the parent will be explained by using FIGS. 19 to 27. First, the feature portion extractor 78 carries out a child-parent relationship classification processing (step S51). The child-parent relationship classification processing will be explained by using FIG. 20.

First, the feature portion extractor 78 initializes a counter i of the child-parent relationship to "1" (step S61). Then, the feature portion extractor 78 judges whether or not the flag has already been set to the i-th child-parent relationship in the child-parent relationship list storage 76 (step S63). When the flag has already been set to the i-th child-parent relationship, the processing shifts to step S75.

On the other hand, when the flag has not been set to the i-th child-parent relationship, the feature portion extractor 78 judges whether or not the path of the URI for the record of this child-parent relationship has been registered (step S65). For example, it is confirmed whether or not "none" is registered for the path of the URI, as depicted in the sixth child-parent relationship in case of the child-parent relationship list as depicted in FIG. 18.

When the path of the URI is "none", the feature portion extractor 78 sets a "complete flag" to the i-th child-parent relationship (step S73). In the example of FIG. 18, the C flag representing the completion of the processing is set to the sixth child-parent relationship. The completion of the processing means that there is no need to further process this child-parent relationship. This case means that the business processing for this job type identifier is carried out regardless of the HTTP message. Then, the processing shifts to the step S75.

On the other hand, when the path of the URI has been registered, the feature portion extractor 78 searches the child-parent relationship list for other child-parent relationships including the path of the URI, which is identical to the path of the URI in the i-th child-parent relationship (step S67). When there is no other child-parent relationship including the path of the URI, which is identical to the path of the URI in the i-th child-parent relationship (step S69: No route), the processing shifts to the step S73. In the example of FIG. 18, the path of the URI in the third child-parent relationship is "/gaogao.cgi" and there is no child-parent relationship including the same path of the URI. Therefore, the C flag is set to the third child-parent relationship. This means that any further processing is not required for this child-parent relationship, and in this case, the business processing type can be identified only by the path of the URI without using the parameter portion of the URI.

On the other hand, when other child-parent relationships including the path of the URI in the i-th child-parent relationship are found (step S69: Yes route), namely, the search is successful, the feature portion extractor 78 sets a pattern flag to identify the same pattern to the child-parent relationship list (step S71). In the example of FIG. 18, when the first child-parent relationship is processed and other child-parent relationship including the path "/ugogo.cgi" of the URI is searched, the second child-parent relationship is identified. Therefore, P1 flags representing they are the same patterns are set to the two child-parent relationships. Thus, this indicates it is necessary to analyze the parameter portions for these two child-parent relationships. Similarly, when the fourth child-parent relationship is processed and other child-parent relationship including the path "/hegehege.cgi" of the URI is searched, the fifth child-parent relationship is identified. Therefore, P2 flags representing they are the same patterns are set to these two child-parent relationships.

After that, the feature portion extractor 78 increments "i" by "1" (step S75), and judges whether or not the i-th child-parent relationship exists (step S77). When the i-th child-parent relationship does not exist, the processing returns to the step S63. On the other hand, when the i-th child-parent relationship does not exist, the processing returns to the original processing.

Thus, the child-parent relationships to which the same pattern flags are set will be analyzed for the parameter portions, as described below, to identify a set of (variable+value), which characterizes the business processing.

Returning to the explanation of FIG. 19, the feature pattern extractor 78 next carries out a variable extraction processing (step S55). The variable extraction processing will be explained by using FIGS. 21 to 25.

First, the feature portion extractor 78 initializes "i" to "1" (step S91), and extracts a parent log corresponding to the i-th child-parent relationship to which the pattern flag is set, from the extracted parent log storage 77 (step S93). For example, in case of the first child-parent relationship in FIG. 18, parent logs including the path "/ugogo.cgi" of the URI and the job type identifier IIOP-method1 are extracted. Then, it is assumed that the parameter portions included in the parent logs as depicted, for example, in FIG. 22 are obtained. Similarly, in case of the second child-parent relationship in FIG. 18, parent logs including the path "/ugogo.cgi" of the URI and the job type identifier IIOP-method2 are extracted. Then, it is assumed that the parameter portions included in the parent logs as depicted, for example, in FIG. 23 are obtained.

Next, the feature portion extractor 78 identifies all variable types from the extracted parent logs (step S95). In case of FIG. 22, "sid", "ssid", "uid" and "target" are obtained. In addition, also in case of FIG. 22, "sid", "ssid", "uid" and "target" are obtained. Then, the feature portion extractor 78 initializes "j" to "1" (step S97), and judges whether or not all values of the j-th variable are identical (step S99). When all values of the j-th variable are not identical, the processing shifts to step S103. On the other hand, when all values of the j-th variable are identical, the feature portion extractor 78 registers the j-th variable and its value into the child-parent relationship list in association with the child-parent relationship being processed (step S101).

For example, in case of FIG. 22, values of the variables "sid", "ssid" and "uid" are not identical. On the other hand, the value of the variable "target" is "2" and identical. Then, "target=2" is registered in the column of variable+value in the first line of the child-parent relationship. Similarly, in case of FIG. 23, values of the variables "sid", "ssid" and "uid" are not identical. On the other hand, the value of the variable "target" is "3" and identical. Therefore, "target=3" is registered in the column of variable+value in the second line of the child-parent relationship.

Incidentally, for the following explanation, it is assumed that the parent logs extracted for the fourth child-parent relationship in FIG. 18 include the parameter portions as depicted in FIG. 24, and the parent logs extracted for the fifth child-parent relationship in FIG. 18 include the parameter portions as depicted in FIG. 25. In this case, when the step S101 is executed for the example of FIG. 24, "kk=3" and "target=2" are registered as "variable+value" in the fourth line of the child-parent relationship in the child-parent relationship list. In addition, in case of the example of FIG. 25, "kk=2" and "target=2" are registered as "variable+value" in the fifth line of the child-parent relationship in the child-parent relationship list.

After that, the feature portion extractor 78 increments "j" by "1" (step S103) and judges whether or not the j-th variable exists (step S105). When the j-th variable exists, the processing returns to the step S99. On the other hand, when the j-th variable does not exist, the feature portion extractor 78 increments "i" by "1" (step S107). Then, the feature portion extractor 78 judges whether or not the i-th child-parent relationship exists (step S109). When the i-th child-parent relationship exists, the processing returns to the step S93. On the other hand, when the i-th child-parent relationship does not exist, the processing returns to the original processing.

By carrying out such a processing, it is possible to identify, for each business processing, the parameter portions having possibility to characterize the business processing. Even when the child-parent relationship list at this stage is outputted, it is possible for the user to grasp the parameter portion that characterizes the business processing, even if it is not complete.

Returning to the explanation of FIG. 19, the feature portion extractor 78 carries out a feature variable extraction processing (step S57). The feature variable extraction processing will be explained by using FIGS. 26 and 27.

First, the feature portion extractor 78 identifies one unprocessed set of child-parent relationships to which the same pattern flag is set (step S81). For example, in the example of FIG. 18, two child-parent relationships to which the pattern flag P1 is set and two child-parent relationships to which the pattern flag P2 is set are identified.

Then, the feature portion extractor 78 identifies one unprocessed child-parent relationship in the identified set of the child-parent relationships (step S83). For example, in the example of FIG. 18, the first child-parent relationship is identified. Then, the feature portion extractor 78 compares respective sets of the variable and value, which are registered for the identified child-parent relationship, with sets of the variable and value for the other child-parent relationships to which the same pattern flag is set, and if they are identical, the feature portion extractor 78 deletes the pertinent sets (step S85). In case of the two child-parent relationships for the pattern flag P1, the variable "target" is identical. However, because the values are not identical, there is no deleted set of the variable and value for the two child-parent relationships for the pattern flag P1. On the other hand, in case of the two child-parent relationships for the pattern flag P2, because the set "target=2" of the variable and value for the two child-parent relationships is identical, the set is deleted, and because the values for the variable "kk" are not identical, the set is not deleted.

When such a processing is executed, the child-parent relationship list in FIG. 18 is changed to a state as depicted in FIG. 27. The changed point is a point that the set "target=2" of the variable and value is deleted in the fourth and fifth child-parent relationships to which the same pattern flag P2 is set.

After that, the feature portion extractor 78 confirms whether or not any unprocessed child-parent relationship exists among the child-parent relationships to which the same pattern flag is set (step S87), and when there is at least one unprocessed child-parent relationship, the processing shifts to the step S83. On the other hand, when all child-parent relationships to which the same pattern flag is set have been processed, the feature portion extractor 78 judges whether or not all sets of the child-parent relationships to which the same pattern flag is set have been processed (step S89). When at least one unprocessed set exists, the processing shifts to the step S81. On the other hand, when there is no unprocessed set, the processing shifts to the original processing.

Thus, even when plural sets of the variable and value are included in the parameter portion, it is possible to extract the variable and value, which characterize the business, among the sets.

Returning to the explanation of the processing of FIG. 5, the output unit 79 outputs the child-parent relationship list stored in the child-parent relationship list storage 76 to an output device such as a display device or printer (step S11).

Figures 28, 29:
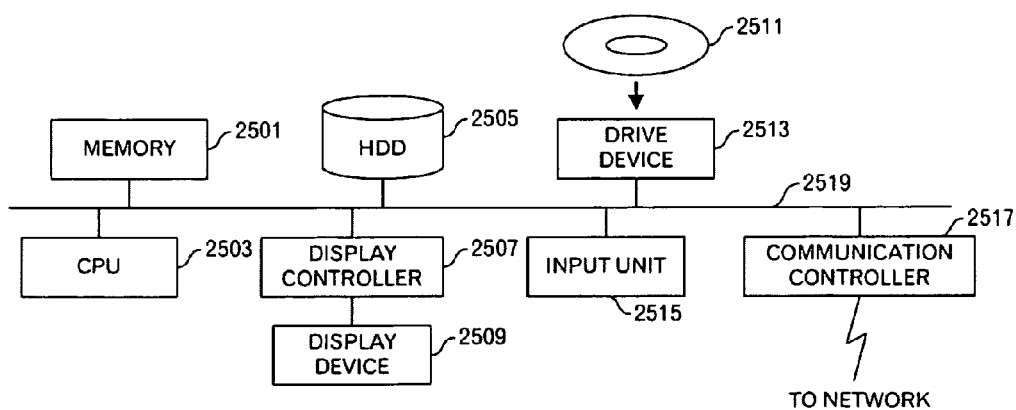
FIG. 28 is a diagram depicting an output example.
FIG. 29 is a functional diagram of a computer.

For example, data as depicted in FIG. 28 is outputted. In the example of FIG. 28, each of 6 business processing is handled as a group, and a pertinent URL (=analysis target machine name+path. The name of the analysis target machine may be identified from data inputted by the user or by reversely searching the Domain Name Server (DNS) for the IP address) and the variable and value of CGI, which characterize the business, are listed. However, because the group 6 is a business processing carried out regardless of the HTTP message, "none" is depicted for the URL and CGI. In addition, because the group 3 is characterized by URL, "none" is depicted for CGI.

When watching such outputs, it becomes possible to grasp how the processing in the system is switched, according to the feature portion in the entire URL to which attention should be paid.

Although the embodiment of this technique was explained, this technique is not limited to this embodiment. For example, as long as the processing results do not change, the aforementioned processing flow can be changed. For example, the steps may be exchanged or the steps may be executed in parallel. In addition, the configuration of the data tables and flags may be changed in any way when the same effect can be obtained.

In addition, the analysis apparatus 7 is a computer device as shown in FIG. 29. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 29. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiment described above can be outlined as follows:

According to a viewpoint of this embodiment, this feature extraction method is a method for extracting a feature portion of a URI, which distinguishes a job executed in a lower-layer server in a multi-layer server system and is included in a message to an upper-layer Web server. This method includes: providing a child log data storage storing child logs, each having a job type identifier (e.g. IIOP-method1 or the like) included in a first message to the lower-layer server and a start time and an end time of a processing executed in the lower-layer server in response to the first message, and a parent log data storage storing parent logs, each having the URI included in a second message to the upper-layer Web server and a start time and an end time of a processing executed in the upper-layer Web server in response to the second message; identifying, for each of the child logs, an inclusive parent log that is a parent log having the start time and the end time, which define a time interval containing a time period from the start time to the end time of the child log, from the parent log data storage, and registering the job type identifier included in the child log and the path (e.g. /hogehoge.cgi or the like) of the URI, which is included in the inclusive parent log, into a child-parent relationship candidate table, and counting and registering frequencies of combinations of the job type identifier and the path of the URI into the child-parent relationship candidate table; extracting, from the child-parent relationship candidate table, the path of URI, which is included in the combination whose counted frequency is the maximum, for each of the job type identifiers, and registering a set of the job type identifier and the extracted path of the URI into a child-parent relationship list; identifying, in the child-parent list, the set satisfying a condition that the path of the URI in the set does not match the paths of the URIs in the other sets.

Thus, it is possible to identify the business processing characterized only by the path of the URI.

In addition, the aforementioned first identifying may include storing the job type identifier included in the corresponding child log in association with the identified inclusive parent log into a storage device. Moreover, this feature extraction method may further include: extracting a group of the sets whose path of the URI is identical with the paths of the URIs in the other sets, from the child-parent relationship list; extracting, for each of the sets included in the extracted group, inclusive parent logs pertinent to the path of the URI and the job type identifier in the set being processed, from the storage device; and extracting, for each of the sets included in the extracted group, a set of a common variable and a common value of the common variable within parameter portions of the URIs included in the extracted inclusive parent logs, among all of the extracted inclusive parent logs, and registering the extracted set into the child-parent relationship list. Thus, it is possible to extract the set of the variable and value, which characterize the business processing, in the parameter portion of the URI.

Furthermore, this feature extraction method may further include: deleting, from the child-parent relationship list, sets of the variable and the value of the variable, which are identical each other, among the sets of the variable and the value of the variable, which are registered for the extracted group in the child-parent relationship list. Thus, it is possible to extract, in the parameter portion of the URI, the sets of the variable and the value, which mostly characterize the business processing. The feature extraction method may further include outputting the child-parent relationship list.

In addition, the aforementioned first identifying may include registering, for the child log whose inclusive parent log does not exist, a combination of the job type identifier included in the child log and data representing no association into the child-parent relationship candidate table, and counting and registering frequencies for the combination of the job type identifier and the data representing no association into the child-parent relationship candidate table. Then, the aforementioned extracting may include registering a set of a specific job type identifier and the data representing no association into the child-parent relationship list, wherein the frequency for a combination of the specific job type identifier and the data representing no association is the maximum. Then, the feature extraction method may further include outputting the specific job type identifier and data representing no corresponding URI.

Thus, it is possible to identify a business processing, which is not associated with a processing for the message to the upper-layer Web server.

Incidentally, a program for causing a computer to execute the aforementioned method can be created, and the program is stored in a computer-readable storage medium or a storage device such as flexible disk, CD-ROM, a magneto-optic disk, a semiconductor memory or hard disk. Incidentally, data during the processing is temporarily stored in a storage device such as a memory of a computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable storage medium storing a program for execution by a computer to perform a feature extraction process for extracting a feature portion of a Universal Resource Identifier (URI), which distinguishes a job executed in a lower-layer server in a multi-layer server system and is included in a message to an upper-layer Web server, said feature extraction process comprising:

identifying, for each of child logs stored in a child log data storage storing child logs, each having a job type identifier included in a first message to said lower-layer server and a start time and an end time of a processing executed in said lower-layer server in response to said first message, an inclusive parent log that is a parent log having said start time and said end time, which define a time interval containing a time period from said start time to said end time of said child log, from a parent log data storage storing said parent logs, each having said URI included in a second message to said upper-layer Web server and a start time and an end time of a processing executed in said upper-layer Web server in response to the second message, and registering said job type identifier included in said child log and a path of said URI, which is included in said inclusive parent log, into a child-parent relationship candidate table, and counting and registering frequencies for each combination of said job type identifier and said path of said URI into said child-parent relationship candidate table;

extracting, from said child-parent relationship candidate table, said path of said URI, which is included in said combination whose counted frequency is the maximum, for each of said job type identifiers, and registering a set of said job type identifier and the extracted path of said URI into a child-parent identifying, in said child-parent relationship list, said set satisfying a condition that said path of said URI in said set does not match said paths of said URIs in the other sets.

2. The computer-readable storage medium as set forth in claim 1, wherein said first identifying comprises storing said job type identifier included in a corresponding child log in association with the identified inclusive parent log into a storage device, and said feature extraction process further comprises:

extracting a group of said sets whose path of said URI matches said paths of the URIs in the other sets, from said child-parent relationship list;

extracting, for each of said sets included in the extracted group, inclusive parent logs pertinent to said path of said URI and said job type identifier in said set being processed, from said storage device; and extracting, for each of said sets included in the extracted group, a set of a common variable and a common value of said common variable within parameter portions of said URIs included in the extracted inclusive parent logs, among all of the extracted inclusive parent logs, and registering the extracted set into said child-parent relationship list.

3. The computer-readable storage medium as set forth in claim 2, wherein said feature extraction process further comprises:

deleting, from said child-parent relationship list, sets of said variable and said value of said variable, said sets being identical with each other, among said sets of said variable and said value of said variable, which are registered for the extracted group in said child-parent relationship list.

4. The computer-readable storage medium as set forth in claim 1, wherein said first identifying comprises registering, for said child log whose inclusive parent log does not exist, a combination of said job type identifier included in said child log and data representing no association into said child-parent relationship candidate table, and counting and registering frequencies for said combination of said job type identifier and said data representing no association into said child-parent relationship candidate table, and said extracting comprises registering a set of a specific job type identifier and said data representing no association into said child-parent relationship list, wherein said frequency for a combination of said specific job type identifier and said data representing no association is the maximum.

5. A feature extraction method for extracting a feature portion of a Universal Resource Identifier (URI), which distinguishes a job executed in a lower-layer server in a multi-layer server system and is included in a message to an upper-layer Web server, said feature extraction method comprising:

providing a child log data storage storing child logs, each having a job type identifier included in a first message to said lower-layer server and a start time and an end time of a processing executed in said lower-layer server in response to said first message, and a parent log data storage storing parent logs, each having said URI included in a second message to said upper-layer Web server and a start time and an end time of a processing executed in said upper-layer Web server in response to the second message;

identifying, for each of said child logs, an inclusive parent log that is a parent log having said start time and said end time, which define a time interval containing a time period from said start time to said end time of said child log, from said parent log data storage, and registering said job type identifier included in said child log and a path of said URI, which is included in said inclusive parent log, into a child-parent relationship candidate table, and counting and registering frequencies for each combination of said job type identifier and said path of said URI into said child-parent relationship candidate table;

extracting, from said child-parent relationship candidate table, said path of said URI, which is included in said combination whose counted frequency is the maximum, for each of said job type identifiers, and registering a set of said job type identifier and the extracted path of said URI into a child-parent relationship list; and identifying, in said child-parent list, said set satisfying a condition that said path of said URI in said set does not match said paths of said URIs in the other sets.

6. A feature extraction apparatus for extracting a feature portion of a Universal Resource Identifier (URI), which distinguishes a job executed in a lower-layer server in a multi-layer server system and is included in a message to an upper-layer Web server, said feature extraction apparatus comprising:

a child log data storage device storing child logs, each having a job type identifier included in a first message to said lower-layer server and a start time and an end time of a processing executed in said lower-layer server in response to said first message;

a parent log data storage device storing parent logs, each having said URI included in a second message to said upper-layer Web server and a start time and an end time of a processing executed in said upper-layer Web server in response to the second message;

a child-parent relation constructor to identify, for each of said child logs, an inclusive parent log that is a parent log having said start time and said end time, which define a time interval containing a time period from said start time to said end time of said child log, from said parent log data storage, and to register said job type identifier included in said child log and a path of said URI, which is included in said inclusive parent log, into a child-parent relationship candidate table, and to count and register frequencies for each combination of said job type identifier and said path of said URI into said child-parent relationship candidate table, and to extract, from said child-parent relationship candidate table, said path of said URI, which is included in said combination whose counted frequency is the maximum, for each of said job type identifiers, and to register a set of said job type identifier and the extracted path of said URI into a child-parent relationship list; and a feature portion extractor to identify, in said child-parent list, said set whose path of said URI does not match said paths of said URIs in the other sets exists.

* * * * *